United States Patent
Xiong et al.

(10) Patent No.: US 11,368,521 B1
(45) Date of Patent: Jun. 21, 2022

(54) UTILIZING REINFORCEMENT LEARNING FOR SERVERLESS FUNCTION TUNING

(71) Applicant: RED HAT, INC., Raleigh, NC (US)

(72) Inventors: Jinjun Xiong, Goldens Bridge, NY (US); Roland Ludwig Huss, Bavaria (DE); Huamin Chen, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/199,710

(22) Filed: Mar. 12, 2021

(51) Int. Cl.
*H04L 67/10* (2022.01)
*G06N 20/00* (2019.01)
*G06N 5/04* (2006.01)

(52) U.S. Cl.
CPC ............... *H04L 67/10* (2013.01); *G06N 5/04* (2013.01); *G06N 20/00* (2019.01)

(58) Field of Classification Search
CPC ........... H04L 67/10; G06N 5/04; G06N 20/00
See application file for complete search history.

(56) References Cited

U.S. PATENT DOCUMENTS

| 10,769,058 B1 * | 9/2020 | Khandelwal | G06F 9/54 |
| 11,184,263 B1 * | 11/2021 | Chen | H04L 47/762 |
| 11,256,555 B2 * | 2/2022 | Goodsitt | H04L 67/306 |
| 2021/0367862 A1 * | 11/2021 | Jain | H04L 41/0806 |

OTHER PUBLICATIONS

Schuler, L. et al. (2020). "AI-based Resource Allocation: Reinforcement Learning for Adaptive Auto-scaling in Serverless Environments" pp. 8.
Wampler Dean (2019). "Ray for the Curious" Distributed Computing with Ray, pp. 12.

* cited by examiner

Primary Examiner — El Hadji M Sall
(74) Attorney, Agent, or Firm — Womble Bond Dickinson (US) LLP (57) ABSTRACT

One or more metrics associated with performance of a serverless function chain are received. The one or more metrics are analyzed by a reinforcement learning (RL) model to determine a tuning factor in view of a goal provided to the RL model. The tuning factor is transmitted to a serverless function controller, wherein the serverless function controller is to utilize the tuning factor to tune the serverless function chain.

20 Claims, 8 Drawing Sheets

UTILIZING REINFORCEMENT LEARNING FOR SERVERLESS FUNCTION TUNING

TECHNICAL FIELD

Aspects of the present disclosure relate to a serverless function system, and more particularly, to utilizing reinforcement learning for serverless function tuning.

BACKGROUND

A serverless function system may be executed by a cloud computing system. The cloud computing system may dynamically manage the allocation and provisioning of serverless functions on servers of the cloud computing system. The serverless functions may be execution environments for the performance of various functions.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

In embodiments, a cloud computing system may provide a serverless framework for the performance of client functions/operations (also referred to as "functions" hereafter). For example, the serverless framework may execute functions of a client web application. The serverless framework may invoke one or more serverless functions to execute the functions for client requests. In embodiments, the serverless functions may be execution environments for the execution of the functions. For example, the serverless functions may be virtual machines (VMs) and/or containers.

A conventional serverless function framework may perform tuning operations on serverless functions. The conventional serverless function framework may either tune serverless functions by modifying the scaling (e.g., how quickly serverless functions are invoked/removed) of the number of serverless functions or by adjusting the amount of computing resources (e.g., processing bandwidth, memory, etc.) that are allocated to the serverless functions. The conventional serverless function framework may perform these tuning operations on the serverless functions on an individual basis.

However, in some embodiments, serverless functions implemented by a serverless function framework may be related to one another. For example, a group of serverless functions may be a serverless function chain, where the outputs of one serverless function serve as the inputs for another serverless function. In such an example, the tuning of serverless functions on an individual basis may be ineffective, as particular serverless functions of the group may bottleneck the other serverless functions of the group. Accordingly, without considering the performance of the entire group of serverless functions when performing the tuning, a conventional serverless function framework may ineffectively tune the serverless functions by allocating more computing resources to the wrong serverless functions and/or inappropriately scaling the number of serverless functions, which may result in increased latencies, decreased performance, and an inefficient use of a finite amount of computing resources of the underlying host system(s) of the serverless function framework.

Aspects of the disclosure address the above-noted and other deficiencies by utilizing a reinforcement learning (RL) model to tune groups of serverless functions. In embodiments, the groups of serverless functions may be a serverless function chain, as previously described. Processing logic executing a RL model may receive metrics associated with the performance of a group of serverless functions. Examples of metrics associated with the group of serverless functions may include, but aren't limited to, response time (also referred to as "latency" hereafter), duration, computing resource usage, serverless function scaling information, serverless function idle time, and relationships between individual serverless functions of the group.

The RL model may analyze the metrics to determine a tuning factor for the group of serverless functions. The RL model may determine the tuning factor in view of a goal that is provided to the RL model. The goal may indicate which metric(s) associated with the group of serverless functions the RL model is to impact using the tuning factor. In embodiments, the goal may indicate that the RL model is to determine a tuning factor that decreases the duration of the group of serverless functions. In an embodiment, the goal may indicate that the RL model is to determine a tuning factor that minimizes the use of computing resources allocated to the group of serverless functions, while still satisfying a performance threshold. In some embodiments, the goal may indicate that the RL model is to determine a tuning factor that adjusts the response time to a desired value. In embodiments, other types of goals may be used.

The tuning factor may include information that is used by a serverless function controller to tune the group of serverless functions. In embodiments, the serverless function controller may tune the group of serverless functions by scaling a number of serverless functions of the group that are active and/or adjusting the amount of computing resources that are allocated to the serverless functions of the group.

After the serverless function controller has tuned the group of serverless functions, the RL model may receive subsequent metrics to determine the impact that the tuning factor had on the performance of the group of serverless functions. The RL model may then analyze the metrics and determine a subsequent tuning factor to try and further improve the performance of the serverless functions. This process may be performed iteratively to continuously improve the performance of the group of serverless functions with subsequent tuning.

Having the processing logic tune groups of related serverless functions, rather than individual serverless functions, may result in a more efficient allocation of computing resources across the serverless functions of a serverless function system, improving the performance of the serverless function system. Furthermore, by tuning the groups of related serverless functions, bottlenecks in a serverless function workflow may be alleviated, improving the performance of the serverless framework system.

Although embodiments of the disclosure may describe the utilization of a RL model to determine tuning factors for serverless functions, embodiments of the disclosure may be performed using other types of models to determine the tuning factors for the serverless functions.

Figure 1:
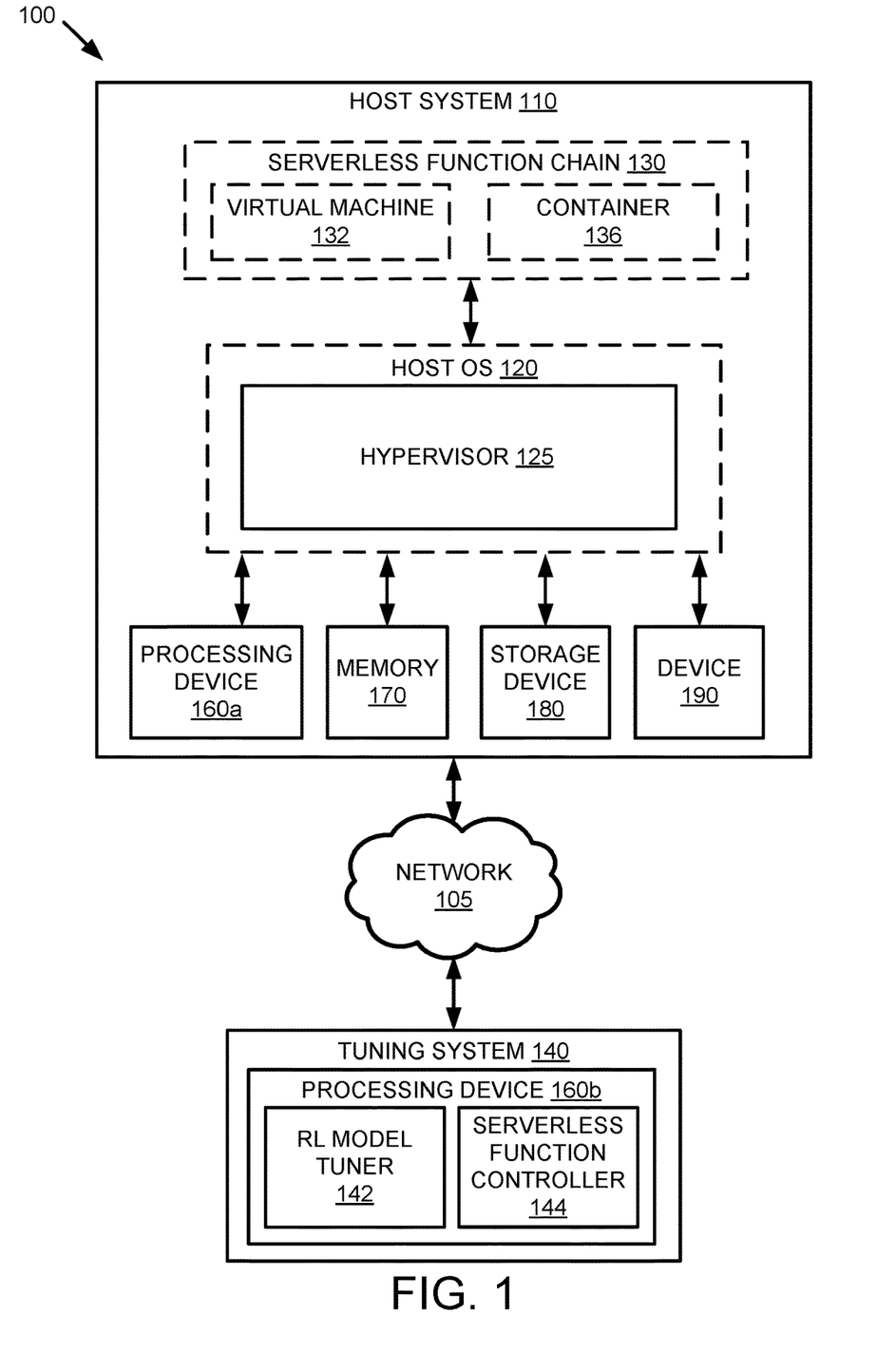
FIG. 1 is a block diagram that illustrates an example computer architecture, in accordance with some embodiments.

FIG. 1 depicts a high-level component diagram of an illustrative example of a computer system architecture 100, in accordance with one or more aspects of the present disclosure. One skilled in the art will appreciate that other computer system architectures 100 are possible, and that the implementation of a computer system utilizing examples of the invention are not necessarily limited to the specific architecture depicted by FIG. 1.

As shown in FIG. 1, computer system architecture 100 includes host system 110 and tuning system 140. The host system 110 and tuning system 140 include one or more processing devices 160a, b, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing device 160a, b. It should be noted that although, for simplicity, a single processing device 160a, b, storage device 180, and device 190 are depicted in FIG. 1, other embodiments of host system 110 and tuning system 140 may include a plurality of processing devices, storage devices, and devices. The host system 110 and tuning system 140 may be a server, a mainframe, a workstation, a personal computer (PC), a mobile phone, a palm-sized computing device, etc. In embodiments, host system 110 and tuning system 140 may be separate computing devices. In some embodiments, host system 110 and tuning system 140 may be implemented by a single computing device. For clarity, some components of tuning system 140 are not shown. Furthermore, although computer system architecture 100 is illustrated as having one host system, embodiments of the disclosure may utilize any number of host systems.

Host system 110 may additionally include one or more virtual machines (VMs) 130, containers 136, and host operating system (OS) 120. VM 130 is a software implementation of a machine that executes programs as though it was an actual physical machine. Container 136 acts as isolated execution environments for different functions of applications, as previously described. The VM 130 and/or container 136 may be serverless functions of a serverless function chain 130 for executing one or more functions of a serverless framework, as previously described. Host OS 120 manages the hardware resources of the computer system and provides functions such as inter-process communication, scheduling, memory management, and so forth.

Host OS 120 may include a hypervisor 125 (which may also be known as a virtual machine monitor (VMM)), which provides a virtual operating platform for VMs 130 and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The host system 110 and tuning system 140 are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi' hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host system 110 and/or tuning system 140.

In embodiments, processing device 160b may execute a RL model tuner 142 and/or serverless function controller 144. The RL model tuner 142 may receive metrics associated with the performance of serverless function chain 130 or other groups of related serverless functions. The RL model tuner 142 may analyze the metrics to determine a tuning factor for the serverless functions in view of a goal. The RL model tuner 142 may transmit the tuning factor to serverless function controller 144. The serverless function controller may receive the tuning factor and utilize the information included in the tuning factor to tune the serverless functions. Although RL model tuner 142 and serverless function controller 144 are illustrated as being executed by a single processing device, in embodiments RL model tuner 142 and serverless function controller 144 may be executed by separate processing devices of the tuning system 140. Further details regarding RL model tuner 142 and serverless function controller 144 will be discussed at FIGS. 2-8 below.

Figure 2:
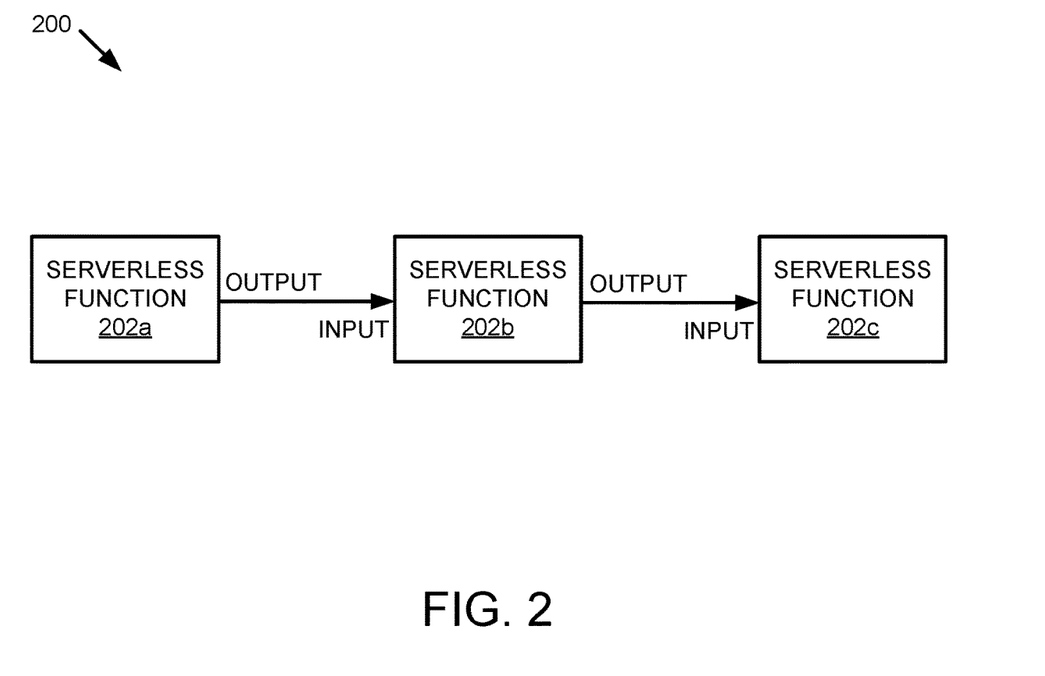
FIG. 2 is an illustration of a first type of serverless function chain, in accordance with embodiments of the disclosure.

FIG. 2 is an illustration of a first type of serverless function chain 200, in accordance with embodiments of the disclosure. The serverless function chain includes serverless functions 202a-c supported by a host system. In embodiments, serverless functions 202a-c may be any combination of VMs and/or containers (e.g., VM 130 and/or container 136 of FIG. 1).

In serverless function chain 200, an output of at least one of the serverless functions serves as an input for another serverless function of the serverless function chain 200. Referring to FIG. 2, serverless function 202a may produce an output that is an input of serverless function 202b. The serverless function 202b may utilize the input received from serverless function 202a to generate an output that is an input of serverless function 202c. Although illustrated as having three serverless functions, other embodiments of serverless function chain 200 may include two or more serverless functions.

Figure 3:
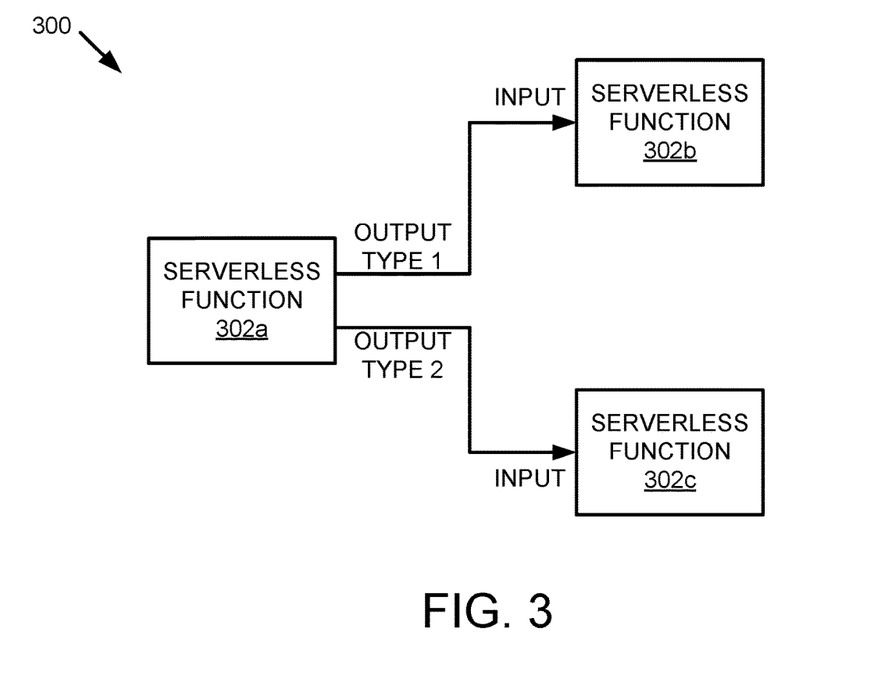
FIG. 3 is an illustration of a second type of serverless function chain, in accordance with embodiments.

FIG. 3 is an illustration of a second type of serverless function chain 300, in accordance with embodiments. The second type of serverless function chain 300 may include serverless functions 302a-c. Serverless function 302a may produce different types of outputs that may be used as inputs for different serverless functions depending on which type of output is produced. For example, if serverless function 302a produces a first type of output, it may be used as an input by a first serverless function. Meanwhile, if serverless function 302a produces a second type of output, it may be used as an input by a second serverless function.

Referring to FIG. 3, serverless function 302a may produce two different types of outputs (e.g., output type 1 and output type 2). If serverless function 302a produces output type 1, the output may be used as an input by serverless function 302b. If serverless function 302a produces output type 2, the output may be used as an input by serverless function 302c.

Although the second type of serverless function chain 300 is illustrated as having serverless function 302a producing two types of outputs for two different serverless functions, embodiments of the disclosure may include serverless functions that produce any number of different types of outputs for any number of serverless functions. Furthermore, it should be noted that the first type of serverless function chain 200, previously described at FIG. 2, and the second type of serverless function chain 300 may not be mutually exclusive. For example, a serverless function chain may include a first set of serverless functions that correspond to the first type of serverless function chain 200 and a second set of serverless functions that correspond to the second type of serverless function chain 300. Additionally, one or more serverless functions of the serverless function chain may be included in both the first set of serverless functions and the second set of serverless functions.

Figure 4:
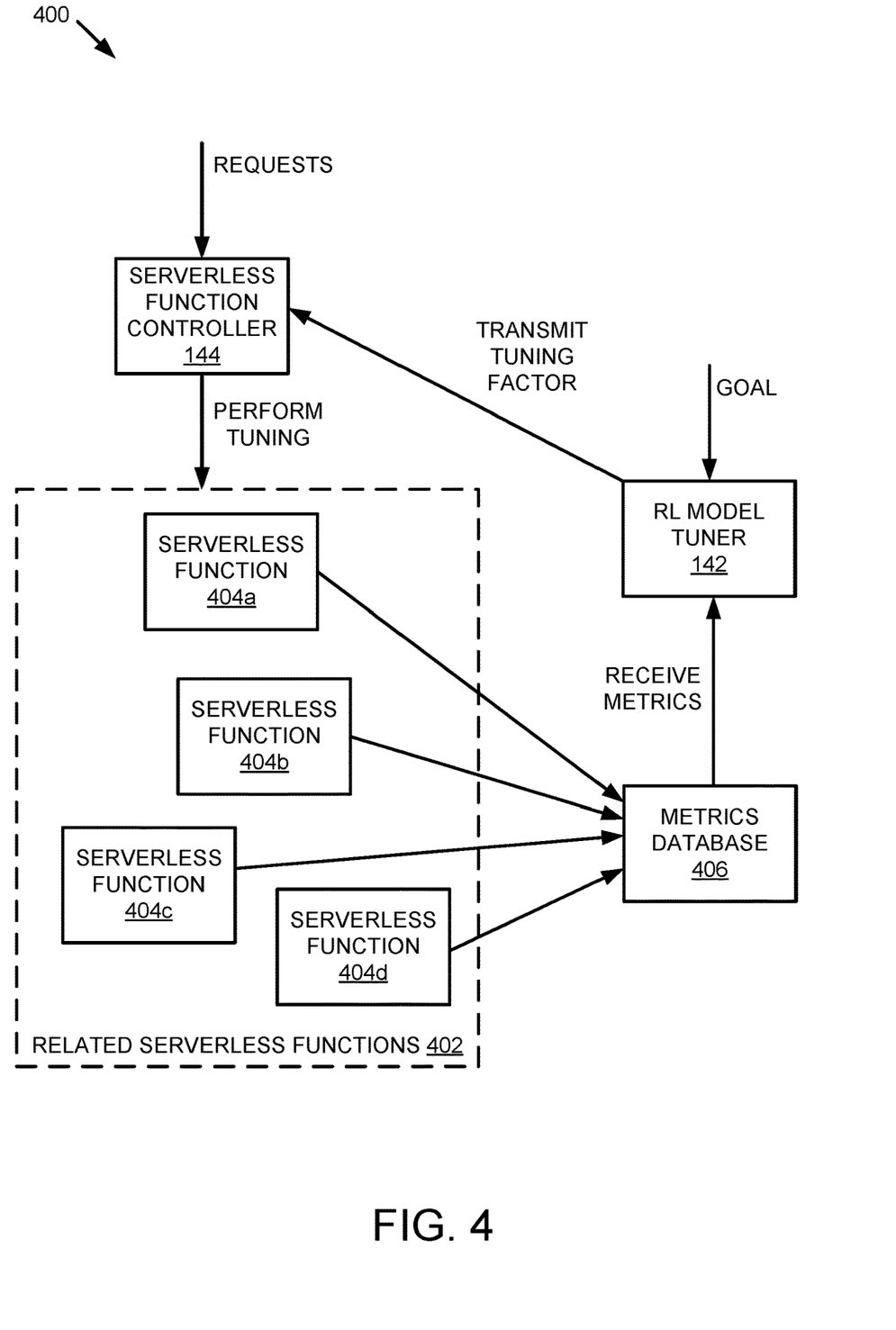
FIG. 4 is an illustration of an example of a serverless function system utilizing a reinforcement learning (RL) model to tune a group of related serverless functions, in accordance with embodiments of the disclosure.

FIG. 4 is an illustration of an example of a serverless function system 400 utilizing a reinforcement learning (RL) model to tune a group of related serverless functions, in accordance with embodiments of the disclosure. The serverless function system 400 may include RL model tuner 142 and serverless function controller 144, as previously described at FIG. 1. The serverless function system 400 may further include related serverless functions 402, which includes serverless functions 404a-d, and metrics database 406.

In some embodiments, the related serverless functions 402 may correspond to a serverless function chain, as previously described. In embodiments, the related serverless functions 402 may be related by other means. For example, the related serverless functions 402 may be associated with the same user, same project, same organization, etc. As the serverless functions 404a-d of the related serverless functions 402 perform various operations, the serverless functions 404a-d may provide metrics associated with the performance of serverless functions 404a-d to the metrics database 406. In some embodiments, the metrics may include latencies associated with serverless functions 404a-d. For example, the serverless metric functions may include cold-start latencies (e.g., how long it takes for a serverless function to be invoked and begin executing a function), a total latency (e.g., total time it takes for a serverless function to execute a requested function), or any other type of latency. In embodiments, the metrics may include idle times associated with the serverless functions 404a-d. An idle time may correspond to an amount of time that a serverless function exists while not executing a function. In embodiments, the metrics may include the duration of the related serverless functions 402 (e.g., how long it takes the related serverless functions 402 to execute their tasks). In an embodiment, the metrics may include computing resource usage by the related serverless functions 402. In some embodiments, the metrics may indicate the relationships between individual serverless functions. For example, the metrics may indicate which serverless functions provide an output that is used by an input by another serverless function, as previously described at FIGS. 2-3.

The metrics database 406 may receive the metrics from the serverless functions 404a-d and store the metrics in a data structure at one or more storage devices. In embodiments, the metrics database 406 may be stored at storage device 180 of host system 110 of FIG. 1. In some embodiments, the metrics database 406 may be stored in one or more storage devices of tuning system 140 of FIG. 1. In an embodiment, the metrics database 406 may be stored at one or more storage devices of a separate computing system.

The RL model tuner 142 may receive the metrics from the metrics database 406 and analyze the metrics to determine a tuning factor for the serverless functions 404a-d of the related serverless functions 402. The RL model tuner 142 may determine the tuning factor in view of a goal that is received by the RL model tuner 142. In embodiments, the goal may be provided by a user associated with the related serverless functions 402.

The goal may indicate which metric(s) associated with the related serverless functions 402 the RL model tuner 142 is to impact using the tuning factor. In embodiments, the goal may indicate that the RL model tuner 142 is to determine a tuning factor that reduces the duration of related serverless functions 402. In an embodiment, the goal may indicate that the RL model tuner 142 is to determine a tuning factor that minimizes the use of computing resources allocated to the related serverless functions 402, while satisfying a performance threshold. The performance threshold may correspond to one or more metrics associated with the performance of the related serverless functions 402. For example, the goal may indicate that the RL model tuner 142 is to minimize the amount of computing resources allocated to serverless functions 404a-d while staying under a specified latency threshold. In embodiments, the performance threshold may be satisfied if the associated metrics are less than or equal to the performance threshold. In some embodiments, the performance threshold may be satisfied if the associated metrics are greater than or equal to the performance threshold.

In some embodiments, the goal may indicate that the RL model tuner 142 is to determine a tuning factor that adjusts the response time for the related serverless functions 402 to a desired value. For example, the goal may indicate that the RL model tuner 142 is to determine a tuning factor that results in the related serverless functions 402 having a response time within a threshold value of 200 milliseconds. In embodiments, the goal may indicate that the RL model tuner 142 is to reduce the latency of the related serverless functions 402. In embodiments, other types of goals may be used.

The RL model tuner 142 may analyze the metrics in view of the goal and generate a tuning factor. In embodiments, the tuning factor may include scaling information for scaling a number of serverless functions and/or computing resource allocation information that indicates how computing resources are to be allocated to serverless functions 404a-d. In some embodiments, the RL model tuner 142 may determine the tuning factor by analyzing the relationships between serverless functions 404a-d. For example, if serverless function 404a produces an output that is used as an input for serverless function 404b, then the RL model tuner 142 may determine a tuning factor that scales the serverless functions and/or allocates computing resources to serverless function 404a and serverless function 404b, such that serverless function 404a is not bottlenecking serverless function 404b.

Upon determining the tuning factor in view of the goal and the metrics, the RL model tuner 142 may transmit the tuning factor to the serverless function controller 144. The tuning factor may include information that is used by the serverless function controller 144 to tune the related serverless functions 402.

In embodiments, the serverless function controller 144 may tune the related serverless functions 402 by scaling a number of serverless functions of the group that are active. The serverless function controller 144 may scale the number of serverless functions by deploying/invoking new serverless functions and/or removing/shutting down existing serverless functions of the group of related serverless functions 402.

In some embodiments, the serverless function controller 144 may tune the related serverless functions 402 by adjusting the amount of computing resources that are allocated to the serverless functions of the group. For example, the serverless function controller 144 may allocate amounts of processing bandwidth, memory, storage, etc. to serverless functions 404a-d for the serverless functions 404a-d to execute their various tasks.

In embodiments, the serverless function controller 144 may receive a request for the related serverless functions 402 to perform a function. For example, the serverless function controller 144 may receive a request for the related serverless functions to perform a function of a web application. In embodiments, the serverless function controller 144 may maintain a routing data structure, such as a routing table, that maps requests to corresponding serverless functions 404a-d that are to execute the functions associated with the requests.

After the serverless function controller 144 has tuned the group of serverless functions, the RL model tuner 142 may receive subsequent metrics to determine the impact that the tuning factor had on the performance of the related serverless functions 402 in view of the goal. For example, if the goal provided to the RL model tuner 142 was to reduce the latency of related serverless functions 402, then the RL model tuner 142 may determine whether the previously generated tuning factor reduced the latency of the group of related serverless functions 402 using the metrics.

The RL model tuner 142 may then analyze the metrics and impact the tuning factor had on the performance of the related serverless functions 402 to determine a subsequent tuning factor. The RL model tuner 142 may determine the subsequent tuning factor in view of the impact the previously generated tuning factor had on the related serverless functions. For example, if the previously generated tuning factor increased the computing resources allocated to the related serverless functions 402 and the metrics indicated that increasing the computing resources reduced the latency of the related serverless functions 402 (e.g., the goal), then the subsequent tuning factor may also increase one or more the amount of computing resources allocated to the related serverless functions 402. In another example, if the previously generated tuning factor increased the computing resources allocated to the related serverless functions 402 and the metrics indicated that increasing the computing resources did not reduce the latency of the related serverless functions 402, then the subsequent tuning factor may not increase the amount of one or more of the computing resources allocated to the related serverless functions 402. The process described at FIG. 4 may be performed iteratively to further improve the performance of the related serverless functions 402 with subsequent tuning.

Figure 5:
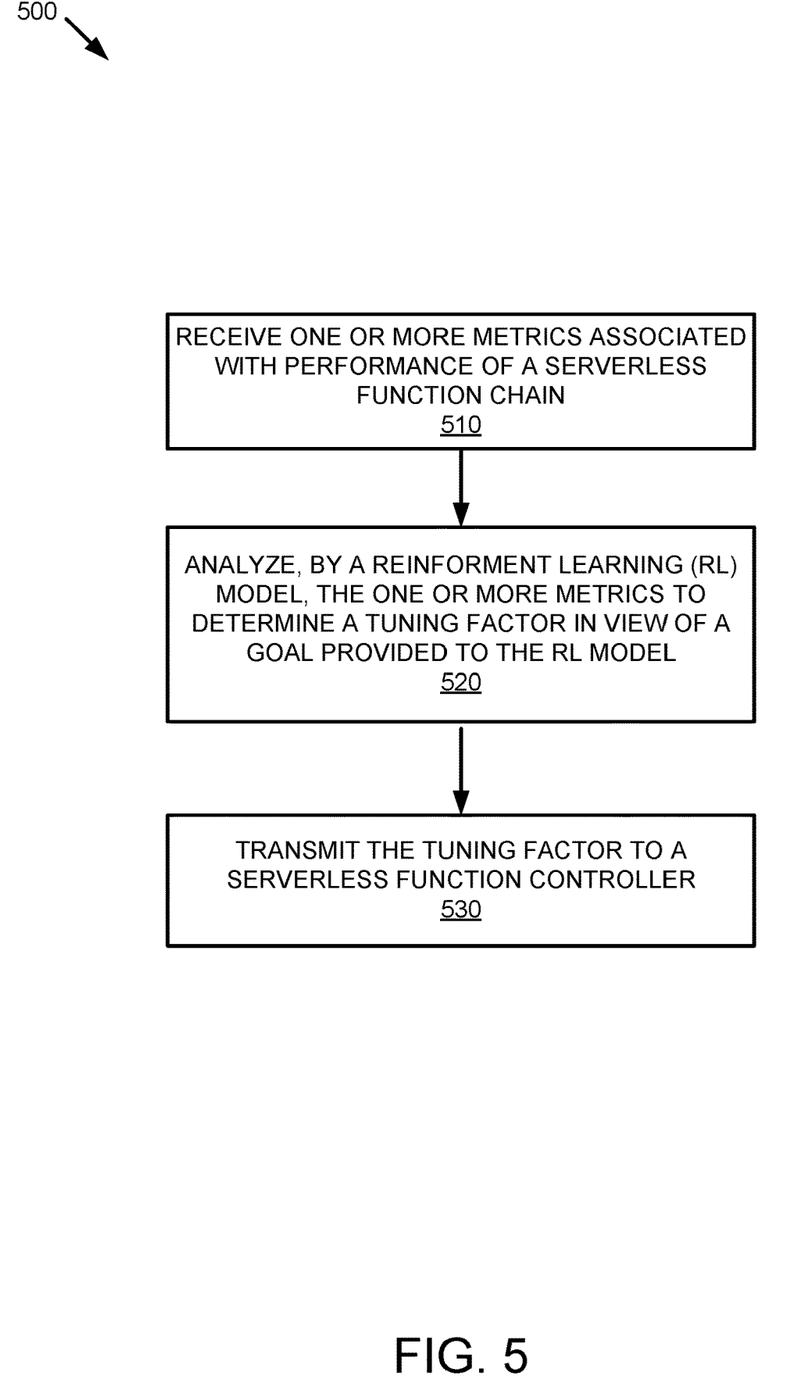
FIG. 5 is a flow diagram of a method of utilizing a RL model to analyze metrics to determine a tuning factor for a serverless function chain, in accordance with some embodiments.

FIG. 5 is a flow diagram of a method 500 of utilizing a RL model to analyze metrics to determine a tuning factor for a serverless function chain, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by RL model tuner 142 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic receives one or more metrics associated with performance of a serverless function chain.

At block 520, the processing logic executing a reinforcement learning (RL) model analyzes the one or more metrics to determine a tuning factor in view of a goal provided to the RL model.

At block 530, the processing logic transmits the tuning factor to a serverless function controller. The serverless function controller may utilize the tuning factor to tune the serverless function chain, as previously described.

Figure 6:
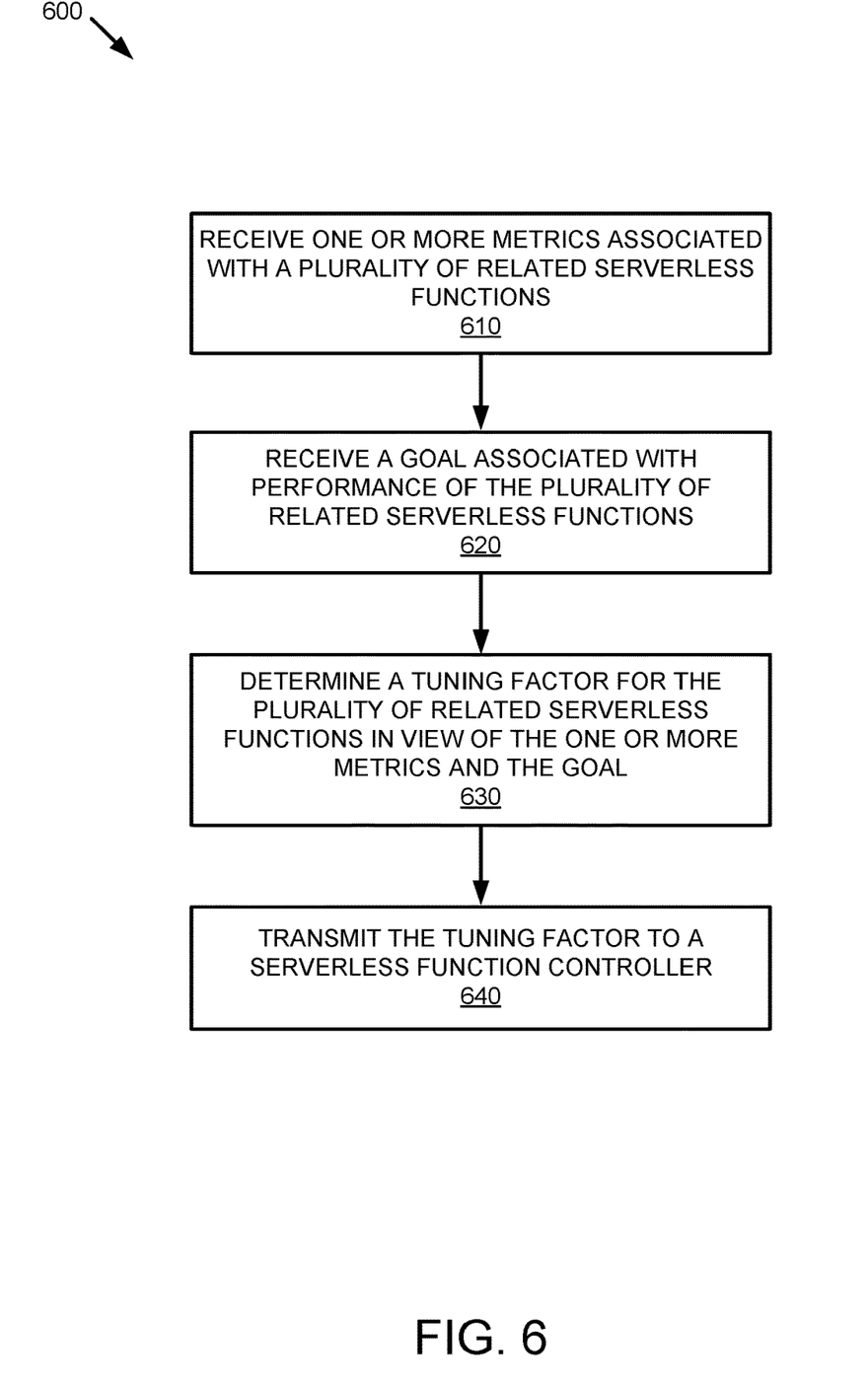
FIG. 6 is a flow diagram of a method of determining a tuning factor for a group of related serverless functions, in accordance with some embodiments.

FIG. 6 is a flow diagram of a method 600 of determining a tuning factor for a group of related serverless functions, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by processing device 160b of tuning system 140 of FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Method 600 begins at block 610, where the processing logic receives one or more metrics associated with a group of related serverless functions. In some embodiments, the group of related serverless functions may include a serverless function chain. In embodiments, the group of related serverless functions may be related by other means. For example, the related serverless functions may be associated with the same user, same project, same organization, etc.

At block 620, the processing logic receives a goal associated with performance of the group of related serverless functions.

At block 630, the processing logic determines a tuning factor for the group of related serverless functions in view of the one or more metrics and the goal.

At block 640, the processing logic transmits the tuning factor to a serverless function controller.

Figure 7:
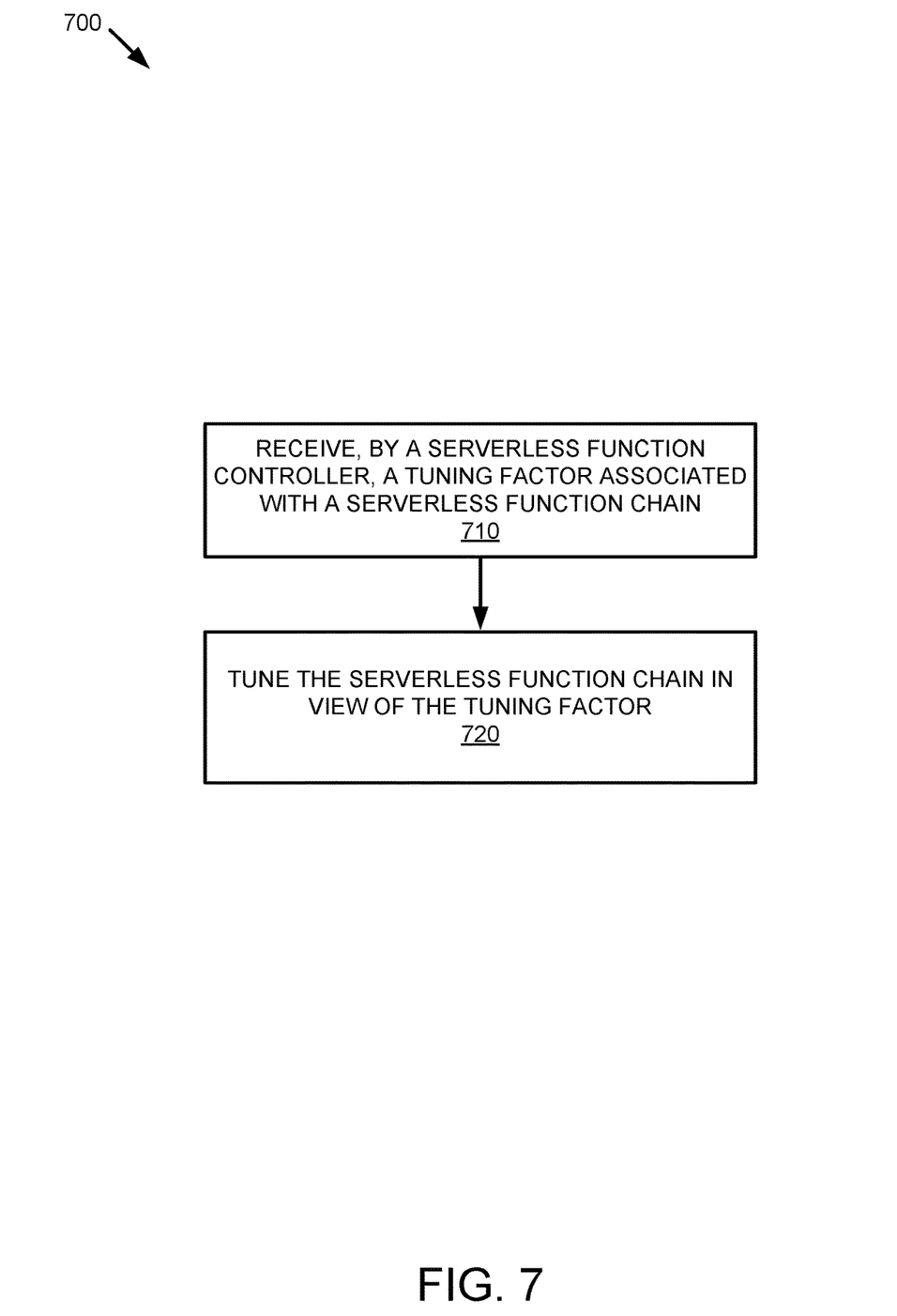
FIG. 7 is a flow diagram of a method of tuning a serverless function chain, in accordance with some embodiments.

FIG. 7 is a flow diagram of a method 700 of tuning a serverless function chain, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by serverless function controller 144 of FIG. 1.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Method 700 begins at block 710, where the processing logic of a serverless function controller receives a tuning factor associated with a serverless function chain. The tuning factor may be determined in view of one or more metrics associated with the serverless function chain and a goal associated with the serverless function chain. In embodiments, the processing logic may receive the tuning factor from a RL model, as previously described.

At block 720, the processing logic tunes the serverless function chain in view of the tuning factor. In some embodiments, the processing logic may tune the serverless function chain by invoking one or more serverless functions for the serverless function chain. In embodiments, the processing logic may tune the serverless function chain by allocating computing resources to the serverless function chain. In an embodiment, the processing logic may receive a subsequent tuning factor associated with the serverless function chain and tune the serverless function chain in view of the subsequent tuning factor.

Figure 8:
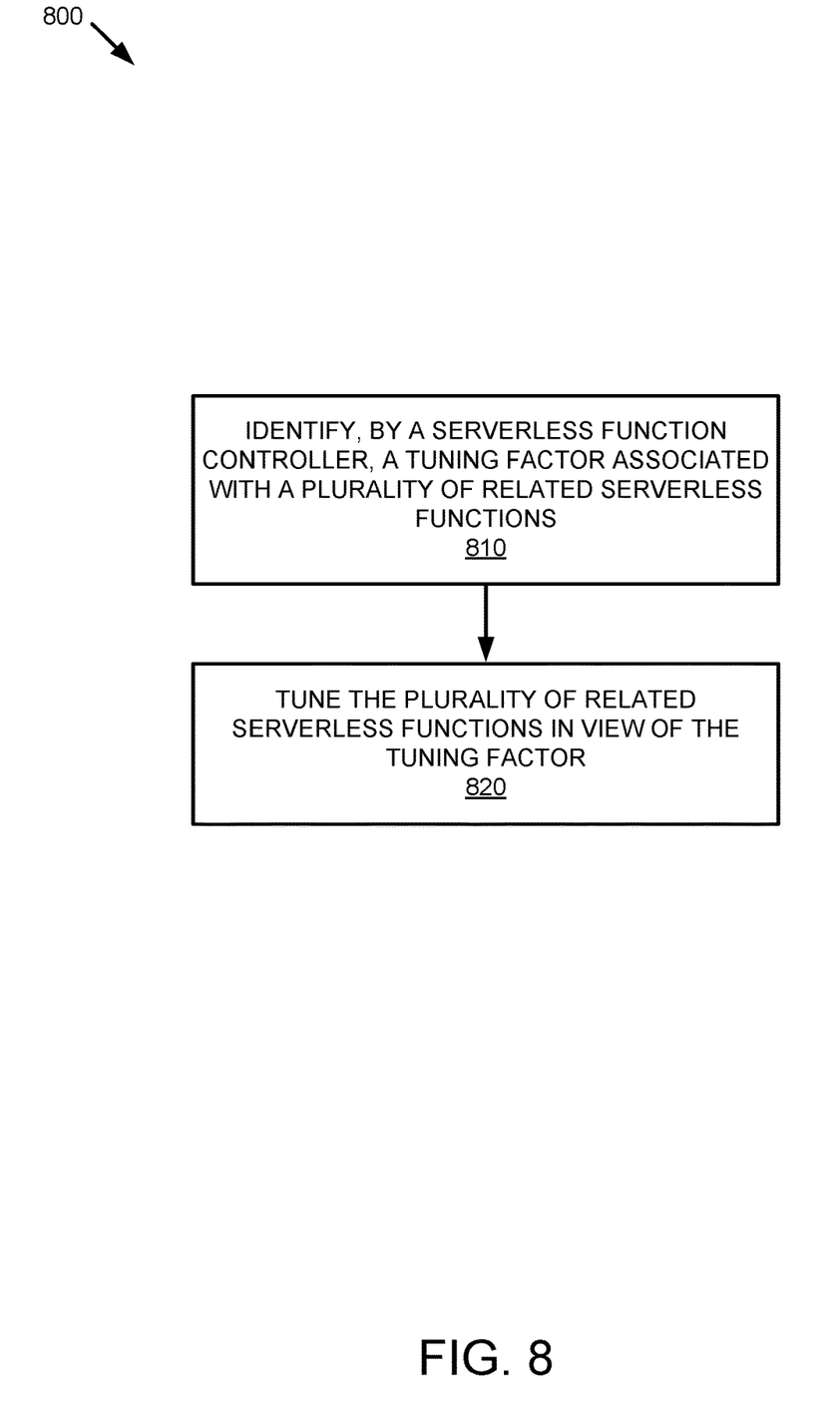
FIG. 8 is a flow diagram of a method of tuning a group of related serverless functions, in accordance with some embodiments.

FIG. 8 is a flow diagram of a method 800 of tuning a group of related serverless functions, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 800 may be performed by serverless function controller 144 of FIG. 1.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Method 800 begins at block 810, where the processing logic of a serverless function controller identifies a tuning factor associated with a group of related serverless functions. The tuning factor may be determined in view of one or more metrics associated with the group of related serverless functions and a goal associated with the group of related serverless functions.

At block 820, the processing logic tunes the group of related serverless functions in view of the tuning factor.

Figure 9:
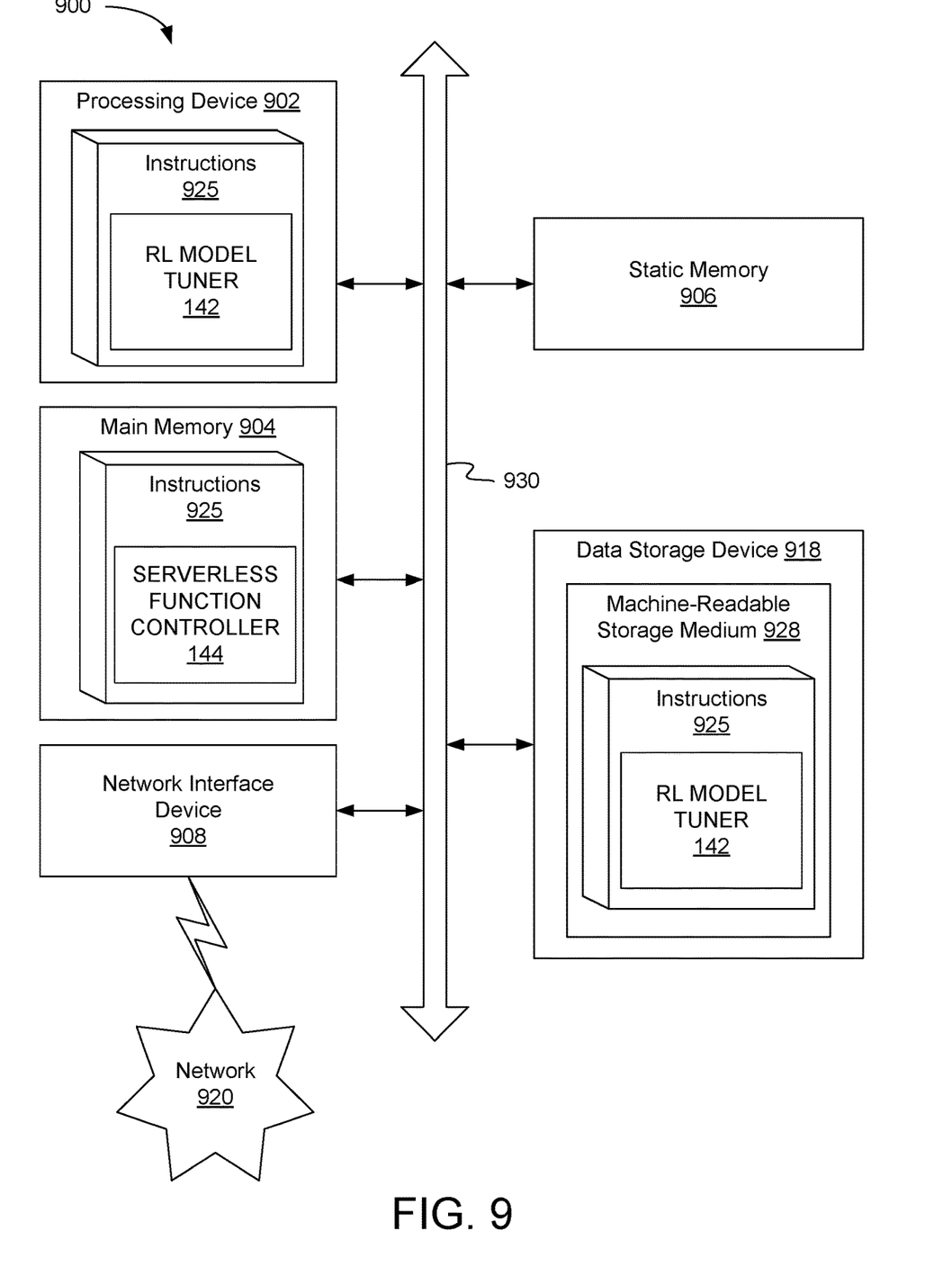
FIG. 9 is a block diagram of an example apparatus that may perform one or more of the operations described herein, in accordance with some embodiments of the present disclosure.

FIG. 9 is a block diagram of an example computing device 900 that may perform one or more of the operations described herein, in accordance with some embodiments. Computing device 900 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 900 may include a processing device (e.g., a general purpose processor, a PLD, etc.) 902, a main memory 904 (e.g., synchronous dynamic random access memory (DRAM), read-only memory (ROM)), a static memory 906 (e.g., flash memory and a data storage device 918), which may communicate with each other via a bus 930.

Processing device 902 may be provided by one or more general-purpose processing devices such as a microprocessor, central processing unit, or the like. In an illustrative example, processing device 902 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 902 may also comprise one or more special-purpose processing devices such as an application specific integrated circuit (ASIC), a field programmable gate array (FPGA), a digital signal processor (DSP), network processor, or the like. The processing device 902 may be configured to execute the operations described herein, in accordance with one or more aspects of the present disclosure, for performing the operations and steps discussed herein.

Computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 910, alphanumeric input device 912, and cursor control device 914 may be combined into a single component or device (e.g., an LCD touch screen).

Data storage device 918 may include a computer-readable storage medium 928 on which may be stored one or more sets of instructions 925 that may include instructions for a RL model tuner, e.g., RL model tuner 142 and/or a serverless function controller, e.g., serverless function controller 144 for carrying out the operations described herein, in accordance with one or more aspects of the present disclosure. Instructions 925 may also reside, completely or at least partially, within main memory 904 and/or within processing device 902 during execution thereof by computing device 900, main memory 904 and processing device 902 also constituting computer-readable media. The instructions 925 may further be transmitted or received over a network 920 via network interface device 908.

While computer-readable storage medium 928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising receiving one or more metrics associated with performance of a serverless function chain; analyzing, by a processing device executing a reinforcement learning (RL) model, the one or more metrics to determine a tuning factor in view of a goal provided to the RL model; and transmitting the tuning factor to a serverless function controller, wherein the serverless function controller is to utilize the tuning factor to tune the serverless function chain.

Example 2 is the method of Example 1, wherein the serverless function chain comprises a first serverless function having an output that is an input of a second serverless function.

Example 3 is the method of Example 1 or Example 2, further comprising receiving one or more subsequent metrics associated with performance of the serverless function chain; determining an impact the tuning factor has on the performance of the serverless function chain in view of the goal; determining a subsequent tuning factor in view of the impact; and transmitting the subsequent tuning factor to the serverless function controller.

Example 4 is the method of Example 1, Example 2, or Example 3, wherein the goal comprises reducing a duration of the serverless function chain.

Example 5 is the method of Example 1, Example 2, Example 3, or Example 4, wherein the goal comprises reducing an amount of computing resources allocated to serverless function chain while satisfying a performance threshold.

Example 6 is the method of Example 1, Example 2, Example 3, Example 4, or Example 5, wherein the goal comprises adjusting a response time of the serverless function chain.

Example 7 is the method of Example 1, Example 2, Example 3, Example 4, Example 5, or Example 6, wherein the serverless function chain comprises a plurality of containers.

Example 8 is the method of Example 1, Example 2, Example 3, Example 4, Example 5, Example 6, or Example 7, wherein the serverless function chain comprises a plurality of virtual machines.

Example 9 is the method of Example 1, Example 2, Example 3, Example 4, Example 5, Example 6, Example 7, or Example 8, wherein the tuning factor indicates scaling a number of serverless functions of the serverless function chain that are active.

Example 10 is the method of Example 1, Example 2, Example 3, Example 4, Example 5, Example 6, Example 7, Example 8, or Example 9, wherein the tuning factor indicates computing resources to be allocated to the serverless function chain.

Example 11 is a system comprising a memory; and a processing device, operatively coupled to the memory, to receive one or more metrics associated with a plurality of related serverless functions; receive a goal associated with performance of the plurality of related serverless functions; determine a tuning factor for the plurality of related serverless functions in view of the one or more metrics and the goal; and transmit the tuning factor to a serverless function controller.

Example 12 is the system of Example 11, wherein the plurality of related serverless functions are associated with at least one of a same user, a same project, or a same organization.

Example 13 is the system of Example 11, or Example 12 wherein the serverless function controller is to tune the plurality of related serverless functions in view of the tuning factor.

Example 14 is the system of Example 11, Example 12, or Example 13, wherein the tuning factor indicates computing resources to be allocated to the serverless function chain.

Example 15 is the system of Example 11, Example 12, Example 13, or Example 14, wherein the processing device executes a reinforcement learning model to determine the tuning factor.

Example 16 is the system of Example 11, Example 12, Example 13, Example 14, or Example 15, wherein the goal comprises adjusting a response time of the plurality of related serverless functions.

Example 17 is the system of Example 11, Example 12, Example 13, Example 14, Example 15, or Example 16, wherein the plurality of related serverless functions comprise a serverless function chain.

Example 18 is a non-transitory computer-readable storage medium including instructions that, when executed by a processing device, cause the processing device to receive, by the processing device of the serverless function controller, a tuning factor associated with a serverless function chain, the tuning factor is determined in view of one or more metrics associated with the serverless function chain and a goal associated with the serverless function chain; and tune the serverless function chain in view of the tuning factor.

Example 19 is the non-transitory computer-readable storage medium of Example 18, wherein the serverless function chain comprises a first serverless function having an output that is an input of a second serverless function.

Example 20 is the non-transitory computer-readable storage medium of Example 18 or Example 19, wherein to tune the serverless function chain, the processing device is further to invoke one or more serverless functions for the serverless function chain.

Example 21 is the non-transitory computer-readable storage medium of Example 18, Example 19, or Example 20, wherein to tune the serverless function chain, the processing device is further to allocate computing resources to the serverless function chain.

Example 22 is the non-transitory computer-readable storage medium of Example 18, Example 19, Example 20, or Example 21, wherein the processing device is further to receive a subsequent tuning factor associated with the serverless function chain; and tune the serverless function chain in view of the subsequent tuning factor.

Example 23 is the non-transitory computer-readable storage medium of Example 18, Example 19, Example 20, Example 21, or Example 22, wherein the serverless function chain comprises a plurality of containers.

Example 24 is the non-transitory computer-readable storage medium of Example 18, Example 19, Example 20, Example 21, Example 22, or Example 23, wherein the serverless function chain comprises a plurality of virtual machines.

Example 25 is a method comprising identifying, by a processing device of a serverless function controller, a tuning factor associated with a plurality of related serverless functions, wherein the tuning factor is determined using a reinforcement learning (RL) model in view of one or more metrics associated with the plurality of related serverless functions and a goal associated with the plurality of related serverless functions; and tuning the plurality of related serverless functions in view of the tuning factor.

Example 26 is the method of Example 25, wherein the plurality of related serverless functions comprise a serverless function chain.

Example 27 is the method of Example 25 or Example 26, wherein tuning the plurality of related serverless functions comprises invoking one or more serverless functions for the plurality of related serverless functions.

Example 28 is the method of Example 25, Example 26, or Example 27, wherein tuning the plurality of related serverless functions comprises allocating computing resources to the plurality of related serverless functions.

Example 29 is the method of Example 25, Example 26, Example 27, or Example 28, wherein the plurality of related serverless functions are associated with at least one of a same user, a same project, or a same organization.

Example 30 is an apparatus comprising means for means for receiving one or more metrics associated with performance of a serverless function chain; means for analyzing, by a reinforcement learning (RL) model, the one or more metrics to determine a tuning factor in view of a goal provided to the RL model; and means for transmitting the tuning factor to a serverless function controller, wherein the serverless function controller is to utilize the tuning factor to tune the serverless function chain.

Example 31 is the apparatus of Example 30, wherein the serverless function chain comprises a first serverless function having an output that is an input of a second serverless function.

Example 32 is the apparatus of Example 30 or Example 31, further comprising: means for receiving one or more subsequent metrics associated with performance of the serverless function chain; means for determining an impact the tuning factor has on the performance of the serverless function chain in view of the goal; means for determining a subsequent tuning factor in view of the impact; and means for transmitting the subsequent tuning factor to the serverless function controller.

Example 33 is the apparatus of Example 30, Example 31, or Example 32, wherein the goal comprises reducing a duration of the serverless function chain.

Example 34 is the apparatus of Example 30, Example 31, Example 32, or Example 33, wherein the goal comprises reducing an amount of computing resources allocated to serverless function chain while satisfying a performance threshold.

Example 35 is the apparatus of Example 30, Example 31, Example 32, Example 33, or Example 34, wherein the goal comprises adjusting a response time of the serverless function chain.

Example 36 is the apparatus of Example 30, Example 31, Example 32, Example 33, Example 34, or Example 35, wherein the serverless function chain comprises a plurality of containers.

Example 37 is the apparatus of Example 30, Example 31, Example 32, Example 33, Example 34, or Example 35, or Example 36, wherein the serverless function chain comprises a plurality of virtual machines.

Example 38 is the apparatus of Example 30, Example 31, Example 32, Example 33, Example 34, or Example 35, Example 36, or Example 37, wherein the tuning factor indicates scaling a number of serverless functions of the serverless function chain that are active.

Example 39 is the apparatus of Example 30, Example 31, Example 32, Example 33, Example 34, or Example 35, Example 36, Example 37, or Example 38 wherein the tuning factor indicates computing resources to be allocated to the serverless function chain.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving one or more metrics associated with performance of a serverless function chain;
   analyzing, by a processing device executing a reinforcement learning (RL) model, the one or more metrics to determine a tuning factor in view of a goal provided to the RL model; and
   transmitting the tuning factor to a serverless function controller, wherein the serverless function controller is to utilize the tuning factor to tune the serverless function chain.

2. The method of claim 1, wherein the serverless function chain comprises a first serverless function having an output that is an input of a second serverless function.

3. The method of claim 1, further comprising:
   receiving one or more subsequent metrics associated with performance of the serverless function chain;
   determining an impact the tuning factor has on the performance of the serverless function chain in view of the goal;
   determining a subsequent tuning factor in view of the impact; and
   transmitting the subsequent tuning factor to the serverless function controller.

4. The method of claim 1, wherein the goal comprises reducing a duration of the serverless function chain.

5. The method of claim 1, wherein the goal comprises reducing an amount of computing resources allocated to serverless function chain while satisfying a performance threshold.

6. The method of claim 1, wherein the goal comprises adjusting a response time of the serverless function chain.

7. The method of claim 1, wherein the serverless function chain comprises a plurality of containers.

8. The method of claim 1, wherein the serverless function chain comprises a plurality of virtual machines.

9. The method of claim 1, wherein the tuning factor indicates scaling a number of serverless functions of the serverless function chain that are active.

10. The method of claim 1, wherein the tuning factor indicates computing resources to be allocated to the serverless function chain.

11. A system comprising:
    a memory; and
    a processing device, operatively coupled to the memory, to:
    receive one or more metrics associated with a plurality of related serverless functions;
    receive a goal associated with performance of the plurality of related serverless functions;

determine a tuning factor for the plurality of related serverless functions in view of the one or more metrics and the goal; and transmit the tuning factor to a serverless function controller.

12. The system of claim 11, wherein the plurality of related serverless functions are associated with at least one of a same user, a same project, or a same organization.

13. The system of claim 11, wherein the serverless function controller is to tune the plurality of related serverless functions in view of the tuning factor.

14. The system of claim 11, wherein the tuning factor indicates computing resources to be allocated to the serverless function chain.

15. The system of claim 11, wherein the processing device executes a reinforcement learning model to determine the tuning factor.

16. The system of claim 11, wherein the goal comprises adjusting a response time of the plurality of related serverless functions.

17. The system of claim 11, wherein the plurality of related serverless functions comprise a serverless function chain.

18. A non-transitory computer-readable storage medium including instructions that, when executed by a processing device of a serverless function controller, cause the processing device to:

receive, by the processing device of the serverless function controller, a tuning factor associated with a serverless function chain, the tuning factor is determined in view of one or more metrics associated with the serverless function chain and a goal associated with the serverless function chain; and tune the serverless function chain in view of the tuning factor.

19. The non-transitory computer-readable storage medium of claim 18, wherein the serverless function chain comprises a first serverless function having an output that is an input of a second serverless function.

20. The non-transitory computer-readable storage medium of claim 18, wherein to tune the serverless function chain, the processing device is further to:

invoke one or more serverless functions for the serverless function chain.

* * * * *